United States Patent
Takekoshi et al.

[11] Patent Number: 5,997,123
[45] Date of Patent: Dec. 7, 1999

[54] IMAGE RECORDING APPARATUS HAVING DENSITY CORRECTION OF PLURAL RECORDING ELEMENTS

[75] Inventors: Nobuhiko Takekoshi, Yokohama; Yoshihiro Takada, Kawasaki; Toshimitsu Danzuka, Tokyo; Yasushi Miura, Kawasaki; Haruhiko Moriguchi, Yokohama, all of Japan

[73] Assignee: Canon Kabushiki Kaisha, Tokyo, Japan

[21] Appl. No.: 07/696,092

[22] Filed: May 6, 1991

[30] Foreign Application Priority Data

May 11, 1990 [JP] Japan .................................. 2-119927

[51] Int. Cl.$^6$ ........................... B41J 29/38; B41J 29/393
[52] U.S. Cl. ............................................... 347/14; 347/19
[58] Field of Search .................. 346/1.1, 75, 140 R; 358/296, 298, 459, 75, 80, 502, 503, 504; 347/5, 9, 12–15, 19; 400/903, 708

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,596,995 | 6/1986 | Yamakawa et al. | 347/237 |
| 4,638,373 | 1/1987 | Logan | 358/298 |
| 4,723,129 | 2/1988 | Endo et al. | 347/56 |
| 4,739,415 | 4/1988 | Toyono et al. | 358/296 |
| 4,740,796 | 4/1988 | Endo et al. | 347/56 |
| 4,827,279 | 5/1989 | Lubinsky et al. | 347/188 |
| 4,829,323 | 5/1989 | Suzuki et al. | 347/15 |
| 4,853,768 | 8/1989 | Suzuki et al. | 358/517 |
| 4,864,392 | 9/1989 | Sato | 358/523 |
| 4,882,621 | 11/1989 | Suzuki et al. | 358/518 |
| 4,908,635 | 3/1990 | Iwasawa et al. | 347/14 |
| 4,939,581 | 7/1990 | Shalit | 386/128 |
| 5,038,208 | 8/1991 | Ichikawa et al. | 358/502 |
| 5,245,355 | 9/1993 | Morton | 358/298 X |
| 5,276,459 | 1/1994 | Danzuka et al. | 346/33 A |
| 5,283,657 | 2/1994 | Ichikawa et al. | 358/296 |
| 5,285,220 | 2/1994 | Suzuki et al. | 347/14 |

FOREIGN PATENT DOCUMENTS

| | | |
|---|---|---|
| 0261801 | 3/1988 | European Pat. Off. . |
| 0440492 | 8/1991 | European Pat. Off. . |
| 59-123670 | 7/1984 | Japan . |
| 59-138461 | 8/1984 | Japan . |
| 0220757 | 11/1985 | Japan ....................................... 346/75 |

*Primary Examiner*—David F. Yockey
*Attorney, Agent, or Firm*—Fitzpatrick, Cella, Harper & Scinto

[57] ABSTRACT

An image recording apparatus for recording an image by using a plurality of recording elements which are driven an accordance with an image signal includes a first correction unit for correcting driving conditions of the recording element, and a second correction unit for correcting a level of the image signal, wherein a variation in the recording elements is corrected by a combination of the first and second correction units. A driving voltage or a width of drive pulse which is applied to each recording element is controlled as a driving condition, thereby making uniform an uneven image density.

39 Claims, 7 Drawing Sheets

IMAGE RECORDING APPARATUS HAVING DENSITY CORRECTION OF PLURAL RECORDING ELEMENTS

BACKGROUND OF THE INVENTION

1. Field of the Invention

The invention relates to an image recording apparatus for recording an image by using a plurality of recording elements.

2. Related Background Art

Hitherto, in such a kind of apparatus, a multi recording head in which a plurality of recording elements are arranged in one recording head to reduce the recording time as short as possible is mainly used as a recording head for use in a printer, a facsimile apparatus, a copying apparatus, or the like. Generally, however, in the case where the recording elements of one multi recording head have been driven under the same driving condition from a viewpoint of a manufacturing problem, an uneven image density occurs in a recording image due to a variation in recording characteristics by the recording elements, so that a recording image of good quality is not achieved. Therefore, an apparatus to prevent the above uneven image density has been proposed. The above apparatus has: memory means for printing a test pattern of a certain predetermined density for a recording head in the case where recording characteristics of recording elements are uneven and for calculating and storing data according to recording characteristics of the recording elements; and means for correcting input image data on the basis of the memory means and the stored data.

Figure 6A:
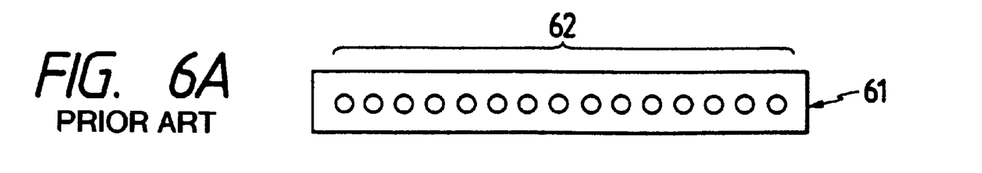
FIGS. 6A to 6E are diagrams for explaining a conventional uneven image density correcting method.
Figure 6B:
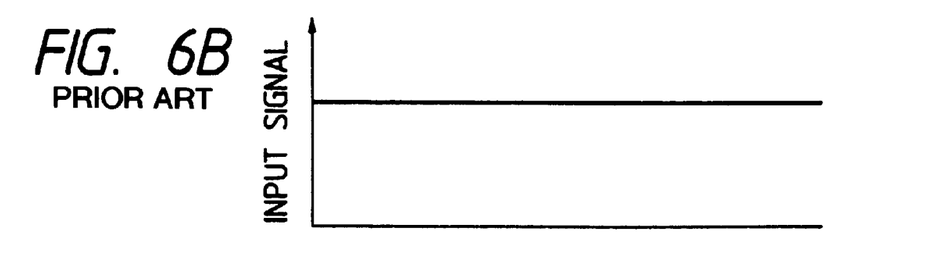
Figure 6C:
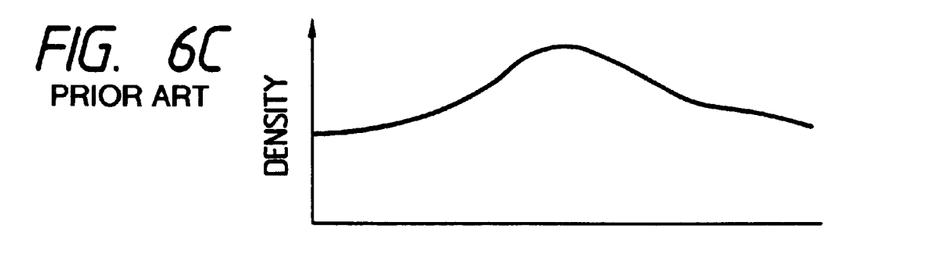
Figure 6D:
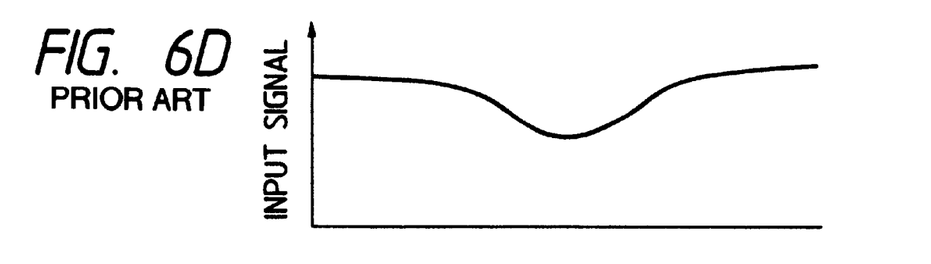
Figure 6E:
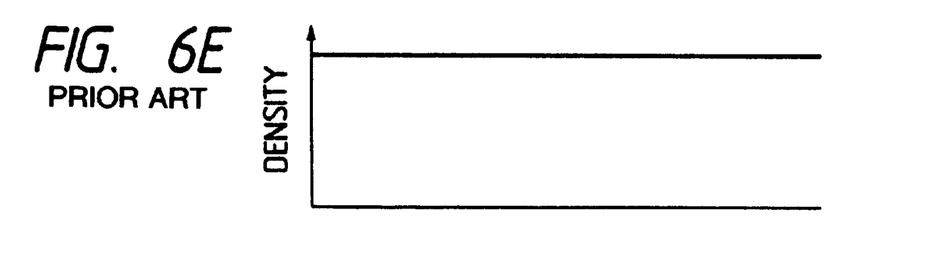

For instance, a multinozzle head of the ink jet type has a multihead 61 which is constructed by arranging recording elements 62 in a line as shown in FIG. 6A. In the case where input signals to the image recording elements are set to be uniform as shown in FIG. 6B, an uneven image density as shown in FIG. 6C occurs as an example. In this case, the input signals are corrected as shown in FIG. 6D, a large input signal is given to the image recording elements in the portion of low densities, and a small input signal is given to the image recording elements in the portion of high densities. In the case of a recording system which can modulate a dot diameter or a dot density, a diameter of dot which is recorded by each image recording element is modulated in accordance with the input signal. For instance, in the ink jet recording system of the piezoelectric type, a driving voltage or a pulse width which is applied to each piezoelectric element, while in the case of the thermal copy transfer recording system, a driving voltage or a pulse width which is applied to each heating element is changed in accordance with the input signal, thereby making uniform the dot diameters or dot densities by the recording elements. Thus a density distribution is made uniform as shown in FIG. 6E. On the other hand, in the case where it is impossible or difficult to modulate the dot diameter or dot density, the number of dots is modulated in accordance with the input signal. A larger number of dots are printed by the image recording elements in the low density portion and a small number of dots are printed by the image recording elements in the high density portion, so that a density distribution is made uniform as shown in FIG. 6E.

A correction amount in the above cases is obtained, for instance, by the following method.

Figure 7:
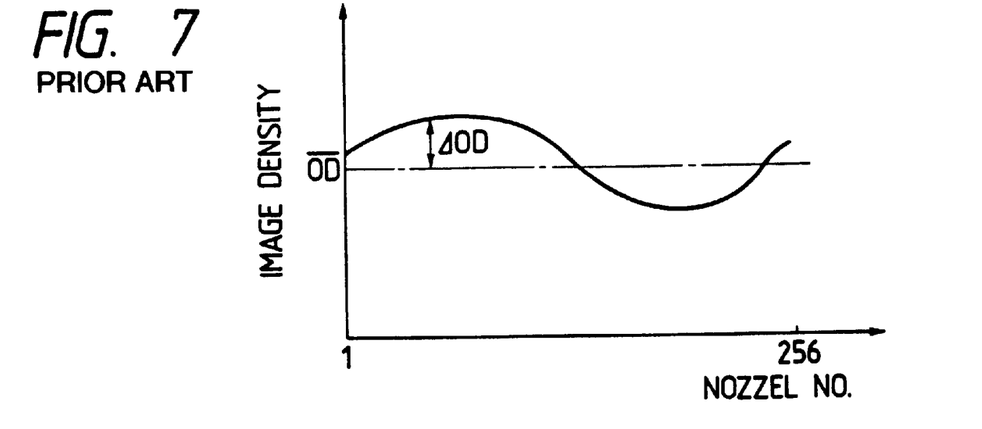
FIG. 7 is a diagram for explaining an uneven image density of a conventional multihead.
Figure 8:
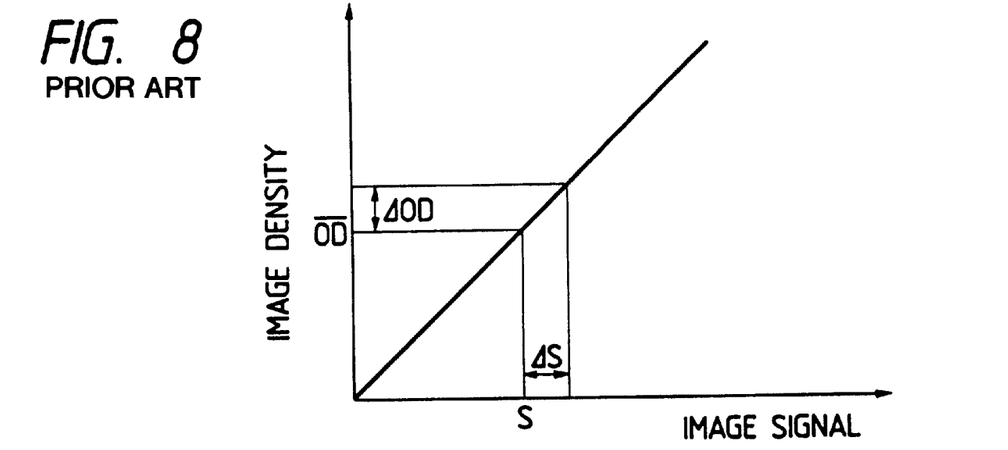
FIG. 8 is a diagram showing ideal tone characteristics between the input image signal and the output density signal.
Figure 9:
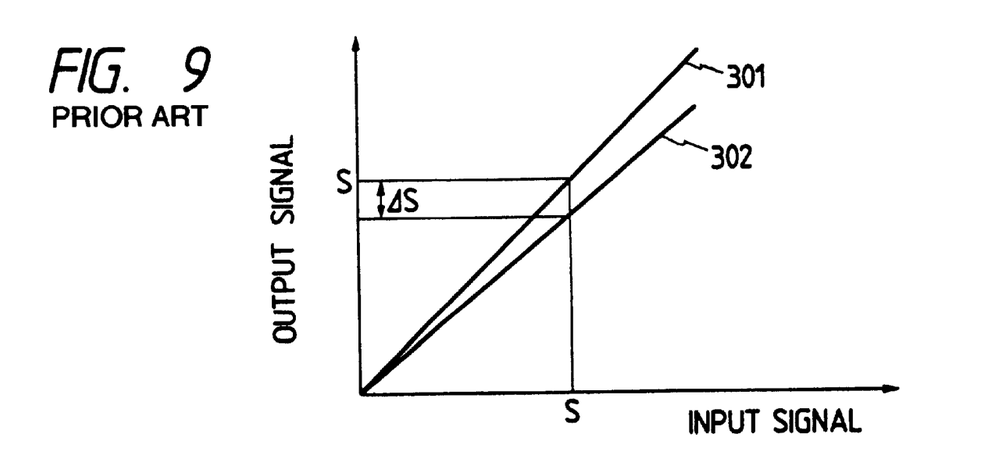
FIG. 9 is a diagram showing conventional uneven image density correction straight lines.

The case of correcting an uneven image density of a multihead comprising 256 nozzles will now be described as an example. FIG. 7 shows an uneven image density distribution which occurs when dots have been printed by a certain uniform image signal S. First, a mean density OD of the head is obtained. Then, densities $OD_1$ to $OD_{256}$ of the portions corresponding to the nozzles are measured. Subsequently, $\Delta OD_n = OD - OD_n$ (n=1 to 256) are obtained. Now, assuming that the relation between the value of the image signal and the output density, that is, the tone characteristic is linear as shown in FIG. 8, it is proper to correct the image signal by only $\Delta S$ in order to correct the density by only $\Delta OD_n$. For this purpose, it is sufficient to execute a table conversion as shown in FIG. 9 to the image signal. In FIG. 9, reference numeral 301 denotes a straight line of an inclination of 1.0. An input signal is generated without being converted. On the other hand, reference numeral 302 denotes a straight line of an inclination of $(S-\Delta S)/S$ and when an input signal of S is given, a signal of $S-\Delta S$ is generated.

Therefore, if the head is driven after executing a table conversion as shown by the straight line 302 in FIG. 9 for the image signal corresponding to the n-th nozzle, a density of the portion which is printed by the n-th nozzle is equal to OD. By performing such a process for all of the nozzles, the uneven image density is corrected and a uniform image is derived. That is, the uneven image density can be corrected by previously obtaining data indicating which table conversion should be optimally performed to the image signal corresponding to which nozzle.

However, in the above conventional example, actually, the tone characteristics of all of the nozzles are not expressed by the straight lines as shown in FIG. 8. Drawbacks in the case where the tone characteristics of the nozzles differ will now be explained. The case of correcting a difference of the image densities between two nozzles will now be considered for simplicity of explanation.

Figure 10:
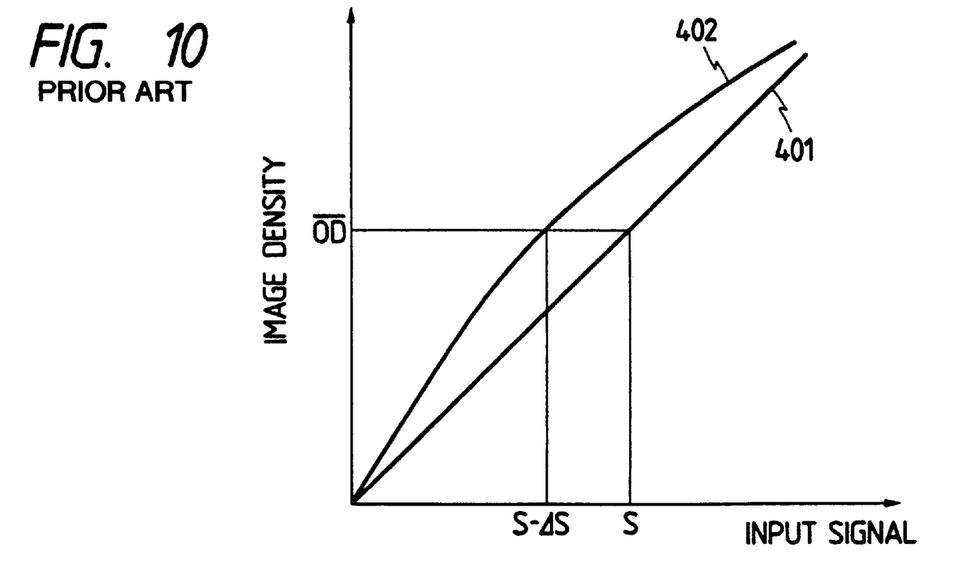
FIG. 10 is a diagram showing tone characteristics of two conventional nozzles having different characteristics.
Figure 11:
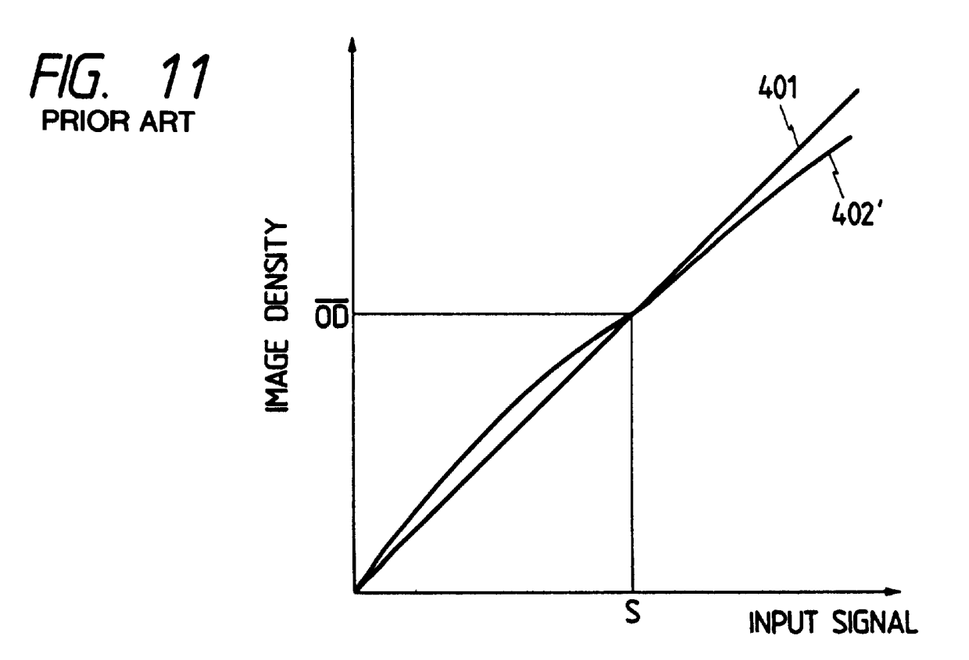
FIG. 11 is a diagram showing tone characteristics of two conventional different nozzles whose uneven image densities have been corrected.

In FIG. 10, reference numeral 401 denotes a tone characteristic of a nozzle-1 and 402 indicates a tone characteristic of a nozzle-2. Since an ink discharge amount of the nozzle-2 is larger than that of the nozzle-1, the nozzle-2 has such a tone characteristic. In the case of correcting the density difference for the input signal S as mentioned above, the image signal for the nozzle-2 is increased by $(S-\Delta S)/S$ times. Thus, the tone characteristic 402 is extended in the X direction by only $S/(S-\Delta S)$ times. The extended tone characteristic 402 is as shown at 402' in FIG. 11.

Although the density difference for the input signal S has been corrected, density differences still remain in the other regions. To correct the density differences for all of the regions, it is necessary that all of the tone characteristics of the nozzles are expressed by straight lines.

However, since the ink emission amounts of the nozzles actually differ, the tone characteristics of the nozzles also differ.

Therefore, there is a drawback such that even if an uneven image density could be corrected at a certain print duty, uneven image densities remain at the other duties and it is very difficult to correct the uneven image densities for the whole region.

The above drawback is not limited to the foregoing ink jet system. Even in the other systems such as thermal copy transfer system, LED printer, and the like, there is a variation of dot diameters which are printed by the heating elements and there is also a variation of tone characteristics. It is, therefore, also similarly very difficult to correct the uneven image densities.

SUMMARY OF THE INVENTION

The invention is made in consideration of the above drawbacks and it is an object of the invention to provide an improved image recording apparatus.

Another object of the invention is to provide an image recording apparatus which can stably obtain a uniform image having excellent tone characteristics.

Still another object of the invention is to provide an image recording apparatus which can obtain an image without an uneven image density even for any print duty.

In order to achieve the above objects, there is provided an image recording apparatus for recording an image in accordance with an input image signal by driving a plurality of recording elements with a driving energy, each of the recording elements having a recording characteristics, comprising: first storing means for storing a first set of correction data for correcting the driving energy for the plurality of recording elements; second storing means for storing a second set of correction data for correcting a level of the image signal for the plurality of recording elements; driving means for driving the recording elements with the driving energies corrected in accordance with the first set of correction data; and correcting means for correcting the input image signals in accordance with the second set of correction data. Control means controls the driving means, the control means being operable in a first mode in which the driving means is caused to drive the recording elements with uniform driving energies to produce the recorded image from which data for the first set of correction data can be collected, and a second mode in which the driving means is caused to drive the recording elements in accordance with a uniform image signal and with drive energies corrected in accordance with the first set of correction data to produce a recorded image from which data for the second set of correction data can be collected, and a third mode in which the driving means is caused to drive the recording elements in accordance with the input image signal corrected in accordance with the second set of correction data and with drive energies corrected in accordance with the first set of correction data to produce a recorded image represented by the input signal.

DETAILED DESCRIPTION OF THE PREFERRED EMBODIMENTS

Preferred embodiments according to the present invention will be described in detail hereinbelow with reference to the drawings.

<First embodiment>

Figure 1:
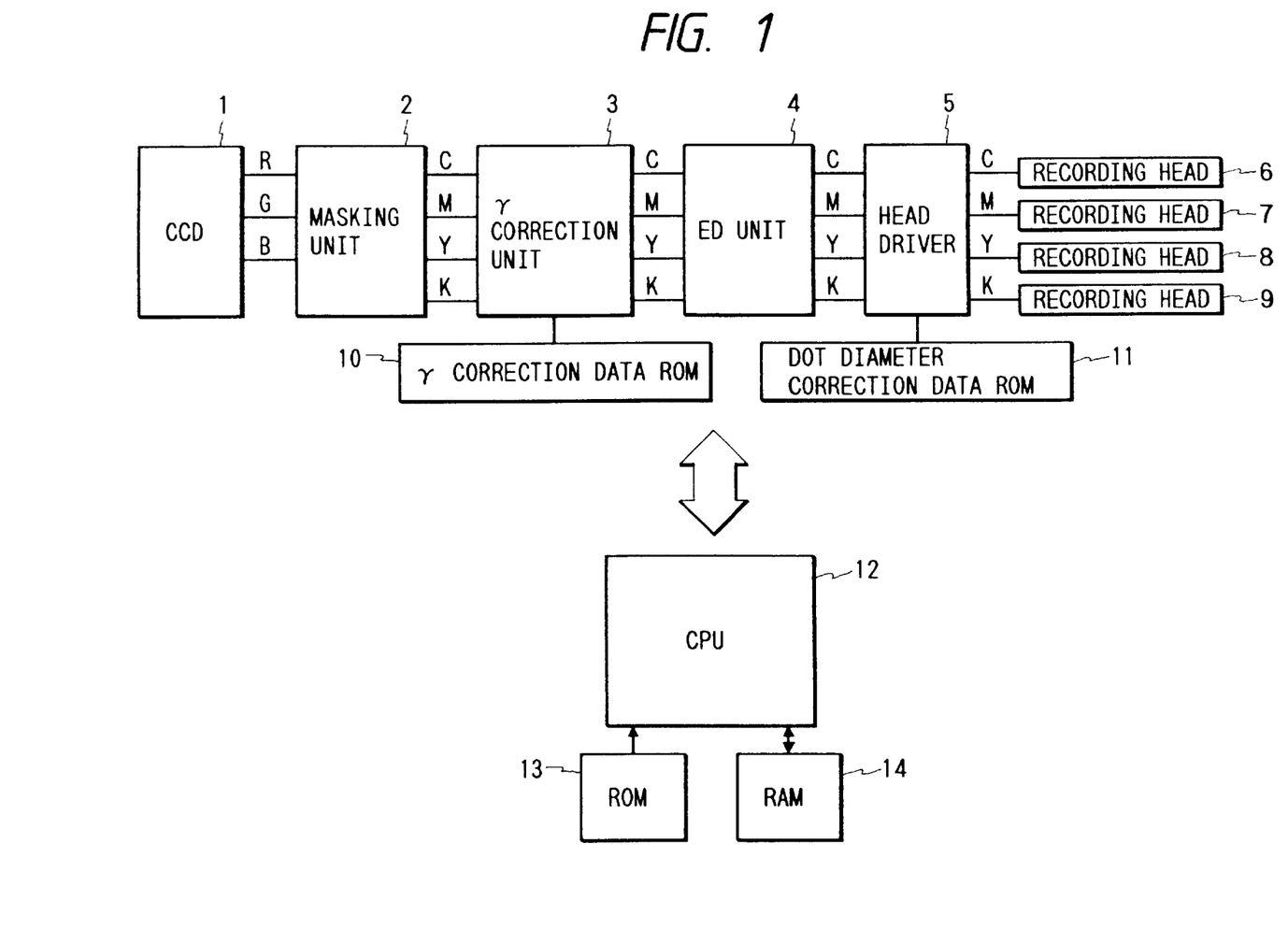
FIG. 1 is a block diagram showing a circuit construction of a copying apparatus in the first embodiment.
Figure 3:
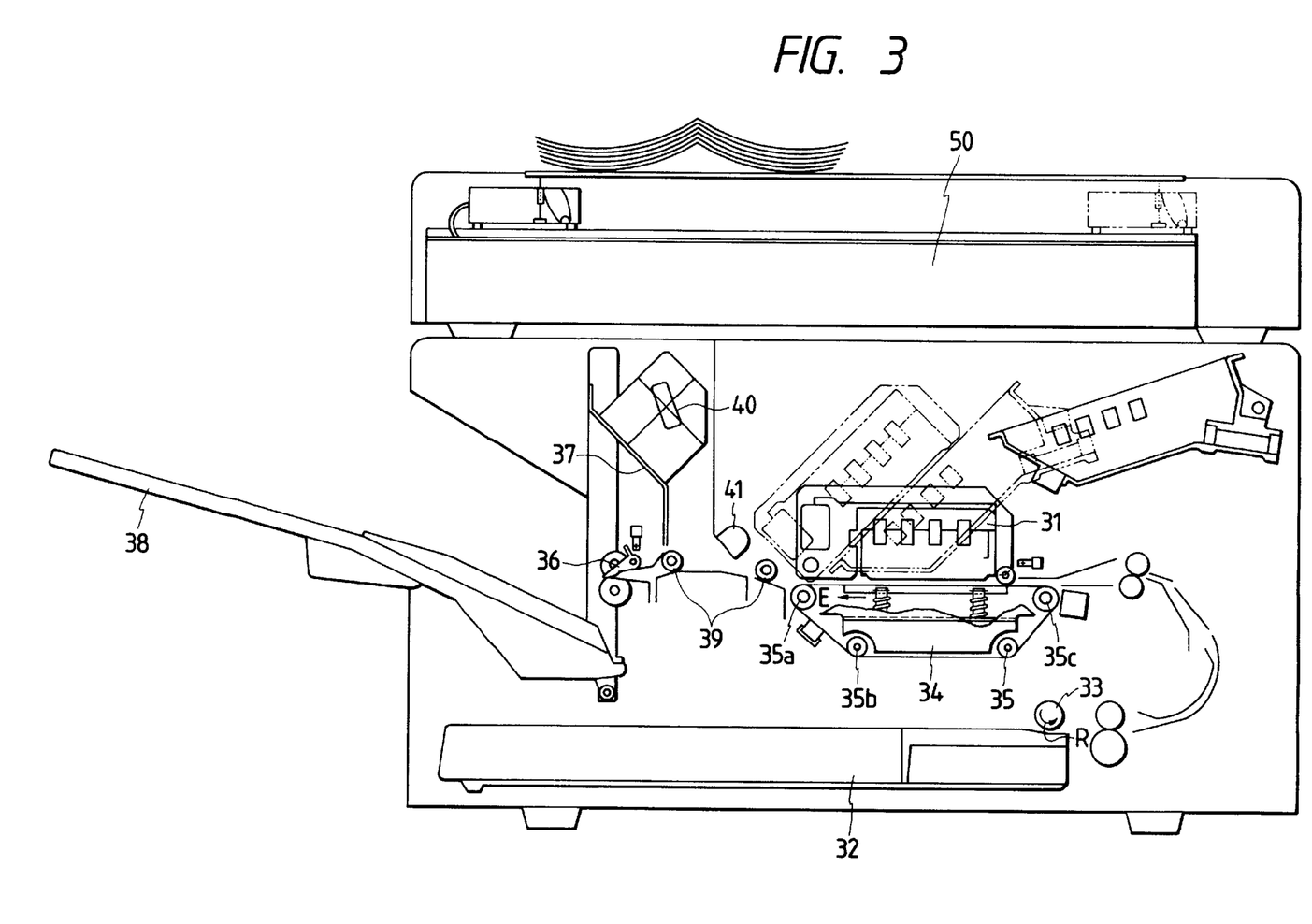
FIG. 3 is a side sectional view showing the copying apparatus of the embodiment.

FIG. 1 is a block diagram showing a circuit construction of a copying apparatus of the first embodiment. FIG. 3 is a side sectional view showing the copying apparatus of the embodiment.

In FIG. 1, reference numeral 1 denotes a CCD for collecting light which has been irradiated to an original image and reflected therefrom, for photoelectrically converting the reflected lights into the electric signals, and for generating the electric signals. Reference numeral 2 denotes a masking unit for converting color components of R (red), G (green), and B (blue) into C (cyan), M (magenta), Y (yellow), and K (black) components. Reference numeral 3 denotes a gamma (γ) correction unit for correcting an uneven image density of image signals generated from the masking unit 2 and for converting the image signals into density signals having tones. Reference numeral 4 denotes an ED unit for binarizing the γ corrected image signals by an error diffusion method; 5 a head driver to control the printing operations of heads 6 to 9; and 6 to 9 the recording heads for printing the C, M, Y, and K components, respectively.

Figure 2:
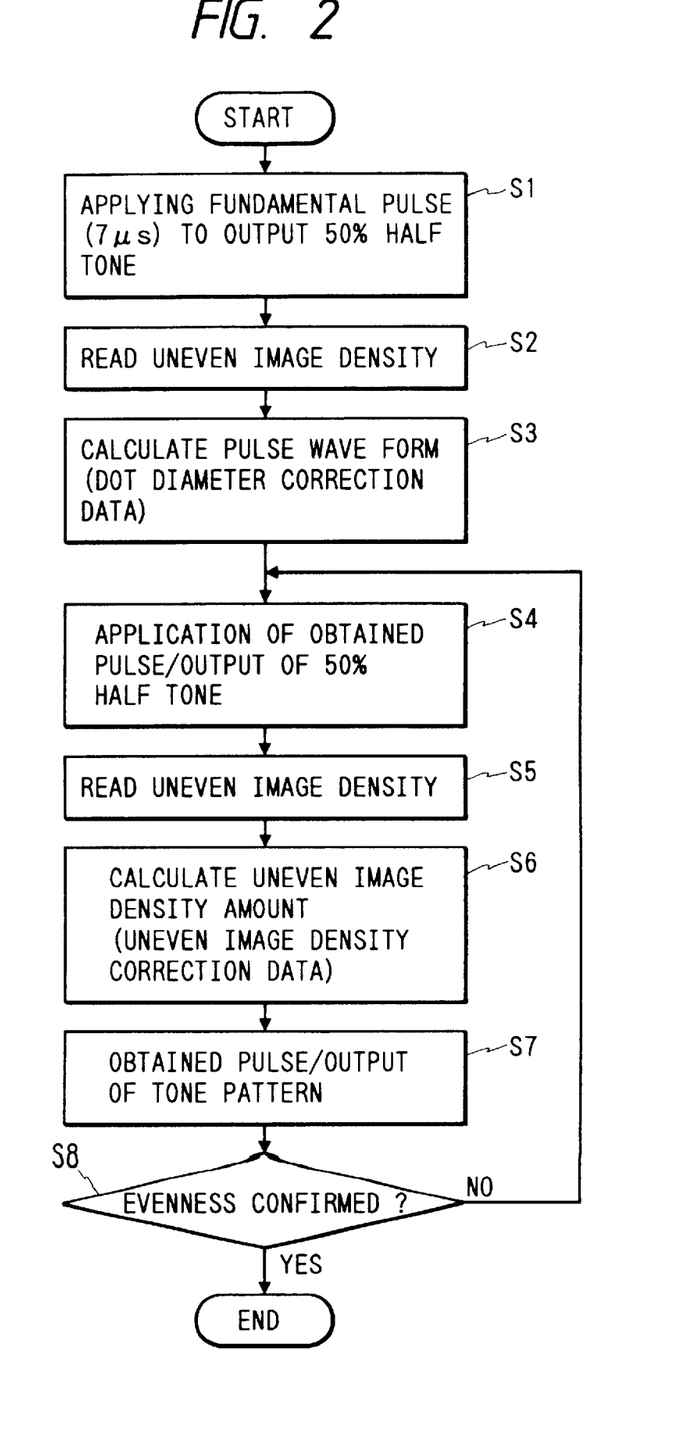
FIG. 2 is a flowchart for explaining a density correcting operation by a CPU 6 in the first embodiment.

Reference numeral 12 denotes a CPU to control the operation of the whole copying apparatus; 13 a ROM in which a control program, an error processing program, a program according to a flowchart of FIG. 2, and the like have been stored; 14 a RAM which is used as a work area of various programs; 10 a γ correction data ROM in which γ correction data to correct the input signals by the γ correction unit 3 has been stored; and 11 a dot diameter correction data ROM in which correction data corresponding to dot diameters in the head driver 5 has been stored.

In FIG. 3, reference numeral 31 denotes a recording head unit in which recording heads only for use of the respective colors of K, C, M, and Y are arranged in parallel in the conveying direction of a recording paper. Each of the recording heads is a full line head in which emission ports are arranged at a density of 400 dpi (dots per inch) in the direction (width direction) which is almost perpendicular to the conveying direction of the recording paper for a range corresponding to a length (297 mm) of short side of the recording paper of the A3 size. Reference numeral 32 denotes a paper feed cassette; 33 a pickup roller which is rotated in the direction indicated by an arrow R; 34 a paper conveying belt; 35a to 35c paper feed rollers; 36 a discharge roller; 37 a cover of an image reading light source which is used for correction of an uneven image density; 38 a discharge tray; 39 a paper pressing roller to prevent a floating of the paper upon image reading; 40 a light source for reading; and 41 a sensor for reading.

When an image recording command is generated, the pickup roller 33 is rotated in the R direction and the recording paper enclosed in the cassette 32 is picked up and conveyed by the pickup roller 33 onto the paper conveying belt 34. After that, a rotating roller 35 is rotated and the recording paper is conveyed in the direction indicated by an arrow E together with the paper conveying belt 34. At this time, the recording heads are driven, the image which has been read by a reader unit 50 is recorded onto the recording paper, and the recording paper is thereafter discharged onto the discharge tray 38 by the discharge roller 36.

On the other hand, when an uneven image density correcting command is generated, the recording paper is fed out of the cassette 32 in a manner similar to the case of the image recording mentioned above. When the recording paper is conveyed by the conveying belt 34, a test pattern is formed onto the recording paper by the recording heads. After that, the recording paper on which the test pattern has been recorded is conveyed to a position of the sensor 41 to read an uneven image density. The test pattern formed on the recording paper is read by the reading sensor 41. An uneven image density correcting process is executed as will be explained hereinlater.

A density correcting method of the first embodiment will now be described.

In the first embodiment, dot diameter correction data is corrected every 128 nozzles (as many as two $IC_s$) which are simultaneously driven. The uneven image density correction data is provided for every nozzle.

In the first embodiment, therefore, explanation will now be made as an example with respect to a copying apparatus using the ink jet system which can easily realize a plurality of nozzles and emits inks by using thermal energies.

In the case of the ink jet system, it is difficult to largely modulate a dot diameter without changing a head shape. Therefore, a control by a dot print amount (the number of dots) is an effective means as means for correcting an uneven image density which is caused due to an unevenness of dot diameters. In the high density portion (particularly, paint printing portion of a print amount of 100%), however, a density of the printing portion corresponding to the recording element of a small dot diameter is smaller than densities of the other portions or a density of the high density portion needs to be reduced as a whole. That is, as also already described in the related background art, if data is generated at a density different from that of the test pattern upon correction of an uneven image density, tone characteristics of the image input signal when the original image has been read and of an image output signal are not always linear, so that a lack of correction of the uneven image density or an excessive correction of the uneven image density occurs.

Therefore, before the uneven image density is corrected by controlling the number of dots, an energy which is applied to each recording element is modulated by a pulse width to thereby uniform the dot diameters. After that, the uneven image density is corrected by the half tone having a most conspicuous uneven image density. Due to this, a uniform output image is derived even at each tone.

When performing such a correction, two kinds of data such as dot diameter correction data and uneven image density correction data are necessary. However, as a countermeasure for the above case, either one of or both of those correction data are corrected for every predetermined number of recording elements (or blocks of recording elements), so that the number of memories can be reduced. In such a case as well, a correcting capability which is equivalent to that in the case of correcting every recording element can be obtained in accordance with a proper combination due to the kinds of recording heads.

The operation of the first embodiment will now be described.

FIG. 2 is a flowchart for explaining the density correcting operation by the CPU 12 in the first embodiment.

Figure 5:
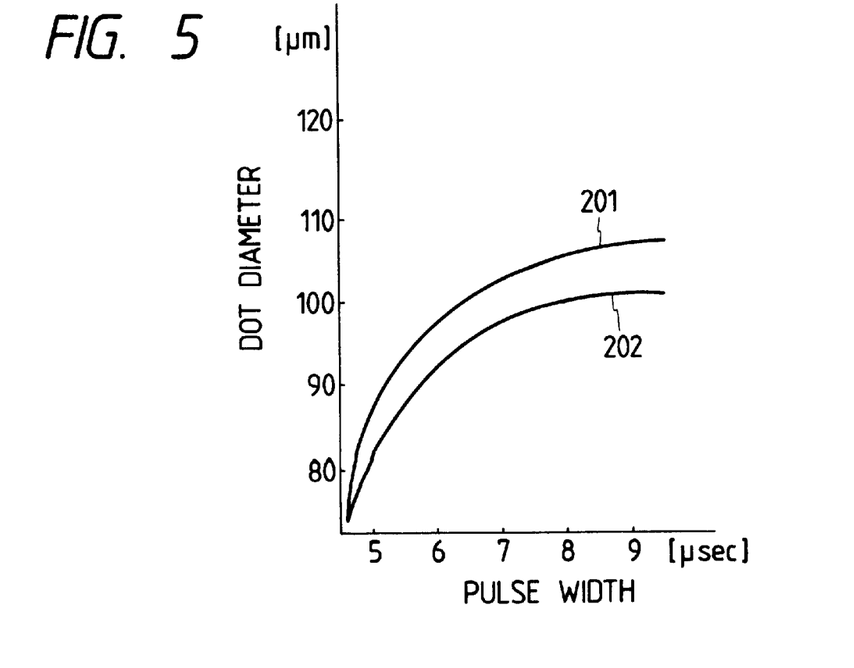
FIG. 5 is a diagram for explaining uneven image density correction curves of the first embodiment.

FIG. 5 is a diagram for explaining uneven image density correction curves in the first embodiment. The following explanation relates to one color of a recording apparatus which can perform a color output.

First, the recording medium is fed out of the cassette 32 by the pickup roller 33. A fundamental pulse of 7 $\mu$sec is applied to the recording head unit 31. A test pattern of a 50% half tone of every color is recorded onto the recording medium (step S1). The test pattern formed on the recording medium is read by the reading sensor 41 (step S2). A pulse waveform is calculated in a manner such that after the sensor 41 has read the uneven image density, a long pulse can be applied to the high density portion so as to increase the dot diameter and that a short pulse can be applied to the low density portion so as to reduce a dot diameter. A pulse waveform (pulse width) which is considered to be optimum is selected from curves as shown in FIG. 5 which have been stored in the dot diameter correction data ROM 11 and is set into the RAM 14 (step S3). In FIG. 5, reference numeral 201 denotes a curve showing the relation between the pulse of the nozzle having a large dot diameter and the dot diameter and 202 indicates a curve showing the relation between the pulse of the nozzle of a small dot diameter and the dot diameter.

A test pattern of the 50% half tone is then recorded onto another recording medium on the basis of the set dot diameter correction data in a manner similar to step S1 (step S4). An uneven image density is read in a manner similar to step S2 (step S5). An uneven image density correcting process by the ordinary $\gamma$ curve is now executed on the basis of the image which has been read. The calculated uneven image density amount is set as uneven image density correction data into the RAM 14 (step S6). A tone pattern is recorded onto the recording medium on the basis of the uneven image density correction data calculated in step S6. If evenness of the uneven image density cannot be confirmed in step S8, the processing routine is returned to step S4 and the correcting process by the $\gamma$ curve is repetitively executed.

As described above, according to the first embodiment, since a uniform output image of good tone characteristics can be obtained, an image of good quality can be also derived from the conventional recording head which cannot be used because of a remarkable uneven image density. Further, a manufacturing yield can be improved and the head manufacturing costs can be reduced.

In the above embodiment, both of the dot diameter correction and the uneven image density correction by the $\gamma$ curve have been executed by actually forming test images and by reading the densities thereof. However, it is also possible to previously store the dot diameter correction data into the ROM upon shipping from the factory or the like and to execute the uneven image density correction by the $\gamma$ curve by reading the densities of the test images. Explanation will be further made hereinbelow.

To stably obtain an image of a good quality after the recording head was manufactured, it is necessary to measure a discharge critical voltage (hereinafter, referred to as $V_{th}$) of each nozzle for the fundamental pulse and to decide a recording head driving voltage (hereinafter, referred to as $V_{op}$) in accordance with $V_{th}$. Therefore, the uneven image density correction in the first embodiment is performed and the ROM in which the uneven image density correction data has been stored and the recording head are together shipped and, after that, they are installed to the copying apparatus shown in FIG. 3. In the case of applying the first embodiment, upon shipping, the dot diameter correction data obtained in step S3 in FIG. 2 is previously stored into the dot diameter correction data ROM 11 as a memory device and the ROM 11 is shipped. The uneven image density correction data which has been read in the apparatus is stored into the RAM 14 as a memory device provided in the apparatus. The density signal which has been read from the original is converted into the output binary signal in accordance with the data by the RAM 14 mentioned above. Further, the output binary signal is energy (pulse waveform) corrected in accordance with the data by the dot diameter correction data ROM 11 and the resultant corrected signal is supplied to the recording head. With the above construction, it is possible to realize an apparatus which can also cope with a change in uneven image density due to a state change of the recording head without making the conventional procedure complicated.

<Second embodiment>

The second embodiment will now be described.

The means for correcting an energy amount which is applied to each recording element is not always limited to the means for controlling a dot diameter as in the foregoing first embodiment. That is, the correcting means for the energy amount in the invention is not limited to the case of making correction data by reading the uneven image density but can be also applied to the case where the stabilization (realization of long life) of each of the recording elements provided in the recording head is considered.

As described in the foregoing first embodiment, in the case of attaching the recording head unit 31 to the copying apparatus shown in FIG. 3, the proper driving voltage ($V_{op}$) is determined from the emission critical voltage ($V_{th}$) of the recording head. As already described in the conventional technique as well, this is because it is difficult to stably manufacture uniform recording heads in the same manner.

Figure 4:
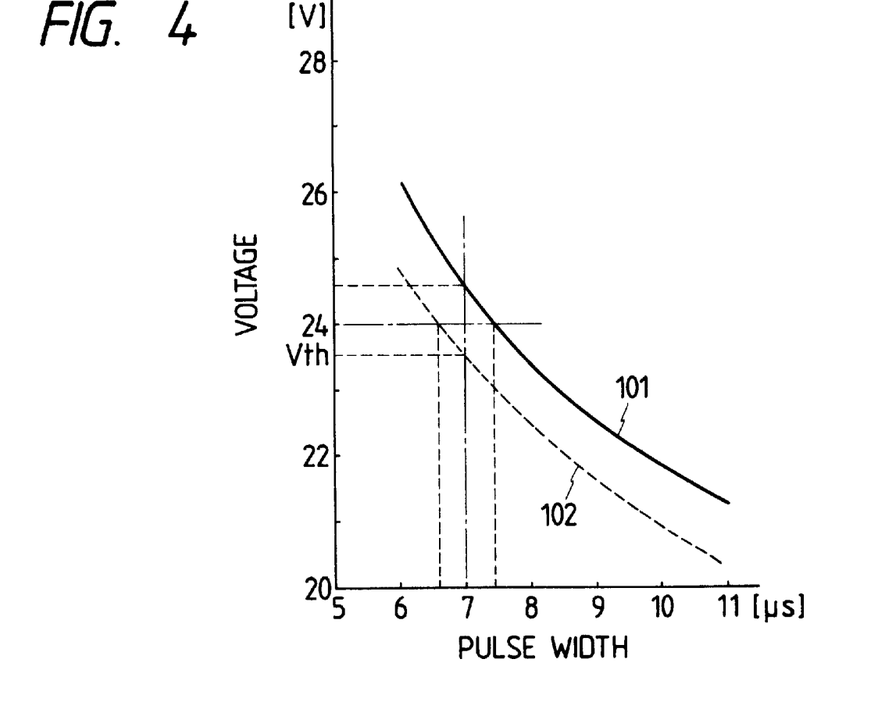
FIG. 4 is a diagram for explaining the relations between the voltage and the pulse width of a recording element of a high $V_{th}$ and a recording element of a low $V_{th}$ in a thermal ink jet multihead.

FIG. 4 is a diagram for explaining the relations between the voltage and the pulse width for the recording element of a high $V_{th}$ and the recording element of a low $V_{th}$ in an ink jet multihead. In the diagram, reference numeral 101 denotes a curve showing the relation between the pulse and the voltage of the recording element of a high $V_{th}$. Reference numeral 102 indicates a curve showing the relation between the pulse and the voltage of the recording element of a low $V_{th}$.

In general, when the recording elements are driven by a single pulse waveform of 7 μsec, a variation of about 1V occurs in $V_{th}$ from FIG. 4. In the conventional technique, a value of $V_{th}$ is set to 23.6V in correspondence to the recording characteristic of low $V_{th}$. For such $V_{th}$, a value of $V_{op}$ is equal to 27.2V which is about 1.7 times as high as $V_{th}$. However, for the nozzle of high $V_{th}$, the value of $V_{op}$ is about 1.12 times as high as the value of $V_{th}$ and a voltage which is applied to emit the ink decreases. ordinarily, in the ink jet head of the system which emits the ink by using a thermal energy as in the embodiment, a ratio (hereinafter, referred to as a k value) of $V_{op}/V_{th}$ is equal to a numerical value which is proportional to an energy which is necessary to emit the ink. Therefore, in FIG. 4, if a wave form of a pulse width of 6.6 μsec is applied to the recording element of low $V_{th}$ and a waveform of a pulse width of 7.5 μsec is applied to the recording element of high $V_{th}$ and the value of $V_{th}$ is made uniform to 24V, every recording element can be driven with stable energy. Therefore, it is possible to prevent a situation such that an energy which is applied to only a certain recording element is too small (or too large). Even in the case of performing the above control, a dot diameter of the recording element having a characteristic of a relatively large dot diameter and a dot diameter of the recording element having a characteristic of a relatively small dot diameter are set to large dot diameters by the pulse widths as shown in FIG. 5. That is, since the dot diameter of the recording element of a high $V_{th}$ and a low k value (applied voltage) is also small, the pulse width modulation for the $V_{th}$ correction is also effective to an uneven image density.

Although the above second embodiment has been described with respect to the case of correcting the energy amount by the pulse width, such a method has been used because it is possible to most easily control in the case of the multi nozzle head in which a plurality of heads are arranged. In the invention, only the pulse width has been made to correspond to the energy amount. For instance, however, it is also possible to control the k value (applied voltage) as mentioned above and to correct the dot diameter (or $V_{th}$) and to correct the uneven image density by the dot number modulation.

On the other hand, in order to make uniform a variation with respect to the recording characteristics (including the durability or the like) of the recording elements, the invention intends to comprise: the first correcting means for controlling an energy (pulse waveform) to be applied; and the second correcting means for making uniform the uneven image density upon recording by the image signal. The invention is not limited to only the ink jet system of the type which emits the ink by using a thermal energy as mentioned above but can be also applied to various kinds of systems such that a variation in recording element can be uniformed by correcting the applied energy amount and a variation in image can be modulated by correcting the image signal. Practically speaking, the invention can be also applied to the ink jet system of the piezoelectric type. In the case of the thermal recording system as well, a variation in resistance value in the head can be corrected by the first correcting means and an evenness of an image upon scanning or the like can be corrected by the second correcting means. It is also possible to correct the uneven image density by the first correcting means by an electrophotograph of the digital system (principle of the PWM) and, further, to use the second correcting means in the case where a correcting range is lacking.

Although the embodiments have been described with respect to the recording apparatus using the recording head of the bubble jet system among the ink jet recording systems, as typical construction and principle, the fundamental principle disclosed in., for instance, the specifications of U.S. Pat. Nos. 4,723,129 and 4,740,796 is used. The above system can be applied to both of what are called on-demand type and continuous type systems. Particularly, in the case of the on-demand type, at least one drive signal which corresponds to recording information and causes a sudden temperature increase exceeding nucleate boiling is applied to an electrothermal converting element arranged in correspondence to a sheet or a liquid channel in which a liquid (ink) is held, thereby causing a thermal energy in the electrothermal converting element and causing nucleate boiling on a heat acting surface of the recording head, so that an air bubble can be formed in the liquid (ink) corresponding to the drive signal in a one-to-one corresponding relation. Therefore, the above method is effective. The liquid (ink) is emitted through a discharge opening by the growth and contraction of the air bubble, thereby forming at least one liquid droplet. By using a pulse-like signal as such a drive signal, the growth and contraction of the bubble are quickly properly performed. Therefore, particularly, the emission of the liquid (ink) having an excellent response speed can be accomplished and it is more preferable. The signals as disclosed in the specifications of U.S. Pat. Nos. 4,463,359 and 4,345,262 are suitable as such a pulse-like drive signal. Further excellent recording can be performed by using the conditions disclosed in the specification of U.S. Pat. No. 4,313,124 of the invention regarding a temperature increasing rate of the heat acting surface.

The construction of the recording head is not limited to the construction (linear liquid channels or right-angled liquid channels) of a combination comprising the emission port, liquid channel, and electrothermal converting element as disclosed in each of the above specifications but can also use the constructions in which heat acting portions are arranged in a bending region as disclosed in the specifications of U.S. Pat. Nos. 4,558,333 and 4,459,600. In addition, it is also possible to use the construction disclosed in Japanese Laid-Open Patent Application No. 59-123670 in which a slit common to a plurality of electrothermal converting elements is used as an emission port of the electrothermal converting element or the construction as disclosed in Japanese Laid-Open Patent Application No. 59-138461 in which an opening which absorbs a pressure wave of a thermal energy is made corresponding to the emission port. That is, even if the recording head has any construction, the recording can be certainly efficiently performed.

Further, the invention can be also applied to the recording head of the full line type having a length corresponding to the maximum width of the recording medium which can be recorded by the recording apparatus as mentioned above. As such a recording head, it is possible to use a construction in which such a length is realized by a combination of a plurality of recording heads or a construction as a single recording head which is integratedly formed. Further, among the recording heads of the serial type, it is also possible to use a recording head of the exchangeable chip type in which by installing the apparatus main body, an electrical connection with the apparatus main body and the supply of the ink from the apparatus main body can be performed.

By adding recovery means, spare auxiliary means, and the like for the recording head which are provided as components constructing the recording apparatus, the recording operation can be further stabilized. Therefore, such a construction is preferable. Practically speaking, by providing capping means for the recording head, cleaning means, pressurizing or attracting means, spare heating means comprising electrothermal converting elements or heating elements different therefrom or a combination thereof, and means for executing a spare emitting mode to perform an emission different from the emission for recording, the stable recording is effectively executed.

On the other hand, with respect to the kinds and the number of recording heads which are installed as well, the invention is not limited to the case where only one recording head is provided in correspondence to a single color ink but can be also applied to the case where a plurality of recording heads are provided in correspondence to a plurality of inks of different recording colors or different densities.

As described above, according to the invention, a uniform image having excellent tone characteristics can be stably obtained.

What is claimed is:

1. An image recording apparatus for recording an original image by driving a plurality of recording elements with a driving energy in accordance with an image signal, said plurality of recording elements being divided into several blocks and being driven on a block unit basis, each of the recording elements having a recording characteristic, said apparatus comprising:

first correcting means for correcting the driving energy of said plurality of recording elements based on each block unit;

driving means for driving said plurality of recording elements with the driving energy corrected by said first correcting means to record the original image in accordance with the image signal;

control means for controlling said driving means to record a test image in accordance with a predetermined test image signal; and second correcting means for correcting a level of the image signal for said plurality of recording elements in accordance with the density of the test image which is formed by driving said plurality of recording elements with the driving energy corrected by said first correcting means, wherein variation in the original image recorded by driving said plurality of recording elements by said driving means is corrected as a consequence of correcting by both said first correcting means and said second correcting means.

2. An apparatus according to claim 1, wherein said first correcting means corrects the driving energy so as to make uniform each said recording characteristic of said plurality of recording elements.

3. An apparatus according to claim 2, wherein each said recording characteristic is a recording dot diameter.

4. An apparatus according to claim 1, wherein the driving energy is modulated by the first correcting means by a driving voltage or a width of drive pulse which is applied to said recording elements.

5. An apparatus according to claim 4, where each of the recording elements causes a state change in ink by using an energy which is generated in accordance with a driving signal and emits an ink droplet from an emission port corresponding to each of the recording elements.

6. An apparatus according to claim 5, wherein the energy is thermal energy.

7. An apparatus according to claim 1, wherein each of the recording elements causes a state change in ink by using an energy which is generated in accordance with a driving signal and emits an ink droplet from an emission port corresponding to each of the recording elements.

8. An apparatus according to claim 7, wherein the energy is thermal energy.

9. An apparatus according to claim 1, wherein each of the recording elements causes a state change in ink by heat.

10. A method of correcting a density of an image in an image recording apparatus having a plurality of recording elements for recording an image in accordance with an image signal by driving said plurality of recording elements with a driving energy, said method comprising:

a first step of providing memory means for storing a plurality of correction data of the driving energy in advance;

a second step of recording a first fundamental pattern of said plurality of recording elements;

a third step of reading the pattern from the first fundamental pattern recorded in said second step;

a fourth step of correcting an energy which is applied to said plurality of recording elements, in accordance with correction data which is selected from said plurality of correction data stored in said memory means in response to the pattern read in said third step;

a fifth step of recording a second fundamental pattern of said plurality of recording elements;

a sixth step of reading the pattern from the second fundamental pattern recorded in said fifth step; and a seventh step of correcting an uneven image density for said plurality of recording elements so as to make the image density uniform by correcting a level of the image signal for said plurality of recording elements based on the pattern which has been read in said sixth step.

11. A method according to claim 10, wherein the second fundamental pattern is recorded by applying the energy corrected in said third step to each of the recording elements.

12. A method according to claim 10, wherein said first fundamental pattern and said second fundamental pattern are read by common reading means for reading a pattern recorded by said recording elements.

13. A method according to any of claims 10 to 12, wherein said first fundamental pattern and said second fundamental pattern are patterns of a same density.

14. A method according to claim 10, wherein each of the recording elements emits an ink from an emission port corresponding to each of the recording elements by causing a state change in the ink, thereby recording an image.

15. A method according to claim 14, wherein each of the recording elements causes a state change in the ink by heat.

16. An image recording apparatus for recording an original image by driving a plurality of recording elements which are driven in accordance with an image signal with a driving energy, each of the recording elements having a recording characteristic, said apparatus comprising:

driving means for driving said plurality of recording elements with the driving energy to record the original image in accordance with the image signal;

control means for controlling said driving means to record a first test image and a second test image, respectively, in accordance with a first test image signal and a second test image signal, each of said first test image and said second test image having an image density;

input means for inputting data based on each of the image density of said first test image and the image density of said second test image, respectively;

first correcting means for correcting the driving energy applied to said plurality of recording elements by said driving means, wherein said first correcting means includes a memory for storing a plurality of correction data for the driving energy, and said first correcting means corrects the driving energy based on proper correction data which is selected from said memory means by said control means in accordance with the image density of said first test image which is inputted through said input means; and second correcting means for correcting a level of the image signal for said plurality of recording elements in accordance with the image density of said second test image which is inputted through said input means, wherein said second test image is formed by driving said plurality of recording elements using the driving energy which has been corrected by said first correcting means, and wherein variation in the original image recorded by driving said plurality of recording elements by said driving means is corrected as a consequence of correction by both said first correcting means and said second correcting means.

17. An image recording apparatus according to claim 16, wherein said first correcting means corrects the driving energy so as to make uniform each said recording characteristic of said plurality of recording elements.

18. An image recording apparatus according to claim 17, wherein each said recording characteristic is a recording dot diameter.

19. An image recording apparatus according to claim 16, wherein the driving energy is modulated by the first correcting means by at least one of a driving voltage and a width of drive pulse which is applied to said recording elements.

20. An image recording apparatus according to claim 16, wherein each of the recording elements causes a change in a state of an ink by using an energy which is generated in accordance with a driving signal and emits, respectively, an ink droplet from an emission port for each of the recording elements.

21. An image recording apparatus according to claim 20, wherein said energy is a thermal energy.

22. An image recording apparatus according to claim 16, wherein each of the recording elements causes a change in a state of an ink by heat.

23. An image recording apparatus according to claim 19, wherein each of the recording elements causes a change in a state of an ink by using an energy which is generated in accordance with a driving signal and emits, respectively, an ink droplet from an emission port for each of the recording elements.

24. An image recording apparatus according to claim 20, wherein the energy is thermal energy.

25. An image recording apparatus for recording an image in accordance with an input image signal by driving a plurality of recording elements with a driving energy, each of the recording elements having a recording characteristic, said apparatus comprising:

first storing means for storing a first set of correction data for correcting the driving energy for each of the plurality of recording elements;

second storing means for storing a second set of correction data for correcting a level of the image signal for the plurality of recording elements;

driving means for driving the recording elements with driving energies;

first correcting means for correcting driving energies in accordance with the first set of correction data;

second correcting means for correcting the input image signals in accordance with the second set of correction data; and control means for controlling the driving means, said control means being operable in an uneven image density correcting operation in which the driving means is caused to drive the recording elements with uniform driving energies to produce a recorded image from which data for the first set of correction data can be collected, and the driving means is caused to drive the recording elements in accordance with a uniform signal and with drive energies corrected by said first correcting means in accordance with the first set of correction data to produce a recorded image from which data for the second data for the second set of correction data can be collected, and an image recording operation in which the driving means is caused to drive the recording elements in accordance with the input image signal corrected by said second correcting means in accordance with the second set of correction data and with drive energies corrected by said first correcting means in accordance with the first set of correction data to produce a recorded image represented by the input signal.

26. An apparatus according to claim 25, wherein the driving means is associated with the first storing means from which the first set of correction data is selected in accordance with the data collected in the uneven image density correcting operation.

27. An apparatus according to claim 25 or 26, wherein the plurality of recording elements are divided into a plurality of blocks and the driving means drives the recording elements with driving energies corrected in accordance with the first set of correction data on a block by block basis in the image recording operation.

28. An apparatus according to claims 25 or 26, wherein the driving means drives the recording elements with driving energies corrected in accordance with the first set of correction data so as to render uniform each of the recording characteristics of the plurality of recording elements.

29. An apparatus according to claim 25, wherein each said recording characteristic is a recording dot diameter.

30. An apparatus according to claims 25 or 26, wherein the driving means drives the recording elements with one of a driving voltage and a width of a drive pulse corrected in accordance with the first set of correction data.

31. An apparatus according to claims 25 or 26, wherein the correcting means converts the level of the image signal for each of said plurality of recording elements in accordance with the second set of correction data so as to eliminate an uneven image density in the recorded image.

32. An apparatus according to claims 25 or 26, wherein the second correcting means converts a level of the respective image signal for each said recording element.

33. An apparatus according to claims 25 or 26, wherein the second correcting means corrects a level of the image signal based on correction data selected from the second storing means in accordance with the second set of correction data.

34. An apparatus according to claims 25 or 26, wherein the recording elements each cause a change in a state of an ink by using energy generated in accordance with driving energy supplied by the driving means to cause an ink droplet to be emitted from an emission port.

35. An apparatus according to claim 34, wherein the energy is thermal energy.

36. A method of correcting a density of an image in an image recording apparatus for recording an image in accordance with an input image signal using a recording head having a plurality of recording elements, the method comprising the steps of:

driving the recording elements with uniform driving energies to produce a first recorded image;

reading the first recorded image to collect a first set of correction data;

driving the recording elements with driving energies corrected in accordance with the first set of correction data to produce a second recorded image;

reading the second recorded image to collect a second set of correction data; and, driving the recording elements in accordance with the input image signal corrected in accordance with the second set of correction data and with drive energies corrected in accordance with the first set of correction data to produce a recorded image representing the input signal.

37. A method according to claim 36, wherein the steps of reading the first and the second recorded images use a reading means for reading.

38. A method according to claim 36 or 37, wherein the recording elements emit, respectively, ink from emission ports by causing a change in a state of the ink, thereby recording an image.

39. A method according to claim 38, wherein the recording elements use heat to cause a change in the state of the ink.

* * * * *

UNITED STATES PATENT AND TRADEMARK OFFICE
CERTIFICATE OF CORRECTION

PATENT NO. : 5,997,123

DATED : December 7, 1999

INVENTORS : Nobuhiko Takekoshi, et al.

It is certified that error appears in the above-identified patent and that said Letters Patent is hereby corrected as shown below:

COVER PAGE

Under [57] Abstract, line 2, "an" should read --in--.

COLUMN 3

Line 23, "is caused to drive" should read --drives--; and
Line 32, "is caused to drive" should read --drives--.

COLUMN 4

Line 52, "delete "a" (second occurrence).

COLUMN 5

Line 6, "of" should read --on--; and
Line 42, "uniform" should read --make uniform--.

COLUMN 6

Line 49, "delete "a".

COLUMN 7

Line 45, "ordinarily," should read --Ordinarily,--.

UNITED STATES PATENT AND TRADEMARK OFFICE
CERTIFICATE OF CORRECTION

PATENT NO. : 5,997,123

DATED : December 7, 1999

INVENTORS : Nobuhiko Takekoshi, et al.

It is certified that error appears in the above-identified patent and that said Letters Patent is hereby corrected as shown below:

COLUMN 8

Line 22, "element" should read --elements-- and
 "uniformed" should read --make uniform--;
Line 40, "in.," should read --in,--; and
Line 41, "is" should read --are--.

COLUMN 12

Line 21, "20," should read --23,--.

COLUMN 14

Line 27, "claim" should read --claims--.

Signed and Sealed this

Fifth Day of December, 2000

Attest:

Q. TODD DICKINSON

Attesting Officer

Director of Patents and Trademarks